US009143188B2

(12) United States Patent
Seibert

(10) Patent No.: US 9,143,188 B2
(45) Date of Patent: Sep. 22, 2015

(54) SPREADING SEQUENCE SELECTION

(71) Applicant: Silver Spring Networks, Redwood Ciry, CA (US)

(72) Inventor: Cristina Seibert, Mountain View, CA (US)

(73) Assignee: SILVER SPRING NETWORKS, INC., Redwood City, CA (US)

( * ) Notice: Subject to any disclaimer, the term of this patent is extended or adjusted under 35 U.S.C. 154(b) by 99 days.

(21) Appl. No.: 13/748,461

(22) Filed: Jan. 23, 2013

(65) Prior Publication Data

US 2014/0204982 A1    Jul. 24, 2014

(51) Int. Cl.
*H04B 1/00* (2006.01)
*H04B 1/707* (2011.01)
*H04J 13/10* (2011.01)

(52) U.S. Cl.
CPC ............. *H04B 1/707* (2013.01); *H04J 13/10* (2013.01)

(58) Field of Classification Search
CPC .... H04B 1/7097; H04B 1/7117; H04B 1/712; H04B 1/7107; H04B 1/7115; H04B 1/707; H04J 13/10
USPC .......... 375/144, 141, 140, 130, 219, 316, 295
See application file for complete search history.

(56) References Cited

U.S. PATENT DOCUMENTS

2007/0104257 A1* 5/2007 Poegel ............................ 375/150
2009/0168848 A1* 7/2009 Constantinidis et al. ...... 375/140
2013/0058360 A1* 3/2013 Oh et al. ........................ 370/474

* cited by examiner

*Primary Examiner* — Zewdu Kassa
(74) *Attorney, Agent, or Firm* — Artegis Law Group, LLP

(57) ABSTRACT

A method for transmitting communications by a transmitter includes selecting a non-alternating spreading sequence, receiving bits for transmission, encoding the bits using the non-alternating spreading sequence to obtain encoded bits, and transmitting the encoded bits to a frequency shift key (FSK) receiver. A method for receiving communications by an FSK receiver includes receiving, by the FSK receiver, encoded bits from a transmitter, decoding the encoded bits using a non-alternating spreading sequence to obtain decoded bits, and processing the decoded bits.

32 Claims, 4 Drawing Sheets

SPREADING SEQUENCE SELECTION

BACKGROUND

Wireless communications rely on various protocols for transmitting communications between transmitters and receivers. Some protocols reflect the physical layer of communications.

When communications are transmitted on the physical layer, spreading sequences may be used to overcome noise that may exist on the signal. Specifically, each bit in the communication is encoded with a predefined series of bits. The number of bits in the series is specified by a spreading factor. For example, a zero (0) may be encoded with a first predefined series of bits having a length defined by the spreading factor. Conversely, a one (1) may be encoded with a second predefined series of bits having a length defined by the spreading factor.

A set of spreading sequences used in the IEEE 802.15.4k amendment transmission protocol is based on alternating patterns of 1's and 0's (i.e., alternating sequence). In other words, in the spreading sequence encoding, a 1 precedes and follows a 0. Conversely, a 0 precedes and follows a 1. For example, for a spreading factor of 8, a input bit value of 1 may produce output of 0101 0101 and an input bit value of 0 may be produce output of 1010 1010. Alternatively, for a spreading factor of 8, a input bit value of 1 may produce output of 1010 1010 and an input bit value of 0 may be produce output of 0101 0101.

SUMMARY

In general, in one aspect, the invention relates to a method for receiving communications by a receiver. The method includes receiving, by a frequency shift key (FSK) receiver, encoded bits from a transmitter, decoding, by the receiver, the encoded bits using a non-alternating spreading sequence to obtain decoded bits, and processing, by the receiver, the decoded bits.

In general, in one aspect, the invention relates to a method for transmitting communications by a transmitter. The method includes selecting a non-alternating spreading sequence, receiving bits for transmission, encoding the bits using the non-alternating spreading sequence to obtain encoded bits, and transmitting the encoded bits to an FSK receiver.

In general, in one aspect, the invention relates to a transmitter for transmitting communications. The transmitter includes a spreading block configured to select a non-alternating spreading sequence, receive bits for transmission, and encode the bits using the non-alternating spreading sequence to obtain encoded bits. The transmitter further includes a bit-to-sym map configured to transmit the plurality of encoded bits to an FSK receiver.

In general, in one aspect, the invention relates to a non-transitory computer readable medium that includes computer readable program code for transmitting communications by a transmitter, by selecting a non-alternating spreading sequence, receiving bits for transmission, encoding the bits using the non-alternating spreading sequence to obtain encoded bits, and transmitting the encoded bits to an FSK receiver.

Other aspects of the invention will be apparent from the following description and the appended claims.

DETAILED DESCRIPTION

Figure 1A:
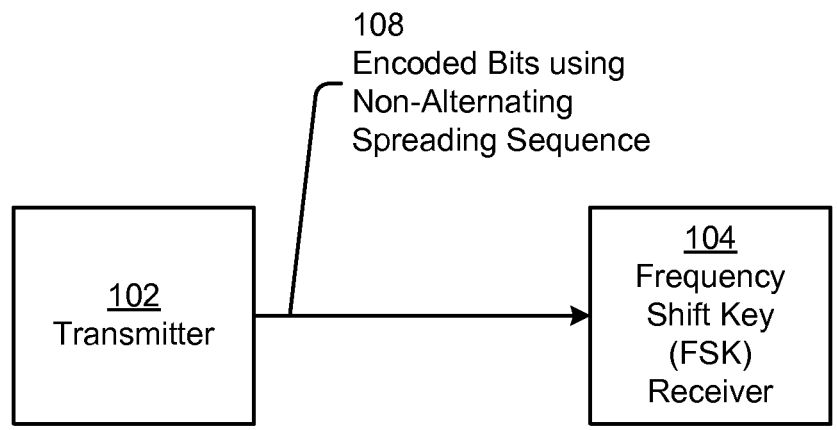
FIGS. 1A and 1B show schematic diagrams in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for transmitting a non-alternating spreading sequence to a frequency shift key (FSK) receiver. Specifically, the FSK receiver receives encoded bits from a transmitter. The FSK receiver decodes the encoded bits using a non-alternating spreading sequence and processes the decoded bits.

In the field of wireless communication, a spreading sequence is defined as an encoding for bits being transmitted. Specifically, each bit in the communication is encoded with a predefined series of bits. In other words, the series of bits replaces the encoded bit. The number of bits in the series is specified by a spreading factor. In other words, the number of bits is directly defined by the spreading factor in one or more embodiments of the invention. For example, a spreading factor of eight means that eight bits are in the series of bits that replaces the encoded bit. A spreading factor of four means that four bits are in the series of bits that replaces the encoded bit. Which bits are in the series of bits is defined by a spreading sequence.

In one or more embodiments of the invention, a non-alternating spreading sequence is a spreading sequence that does not transition between 0 and 1 for each coded bit of the sequence. Specifically, the non-alternating spreading sequence has few transitions between 0 and 1. In one or more embodiments of the invention, the non-alternating spreading sequence has properties such as good cross-correlation properties for re-synchronization in high Doppler channels. Specifically, the cross-correlation properties exceed a threshold. In one or more embodiments of the invention, the threshold may be set by a user or automatically set. Additionally, the threshold may be dependent on the type of receiver. Further, the non-alternating spreading sequence may be used in a variety of demodulator architectures.

By way of an example, the non-alternating spreading sequence may be a MR-OQPSK PHY in the IEEE 802.15.4 standard. In the MR-OQPSK PHY in the IEEE 802.15.4 standard, for a spreading factor of 8, an input bit of 0 may produce output of 1011 0001 and an input bit of 1 may produce output of 0100 1110. Thus, rather than a transition between 0 and 1 for each bit as required by alternating spreading sequences, only 3 or 4 transitions exist between 0 and 1 for a spreading factor of 8 in the MR-OQPSK PHY in the IEEE 802.15.4 standard. For a spreading factor of 16, an input bit of 0 may produce output of 0010 0011 1101 0110 and an input bit of 1 may produce output of 1101 1100 0010 1001 resulting in only eight transitions. Other non-alternating spreading sequences may be used without departing from the scope of the claims. For example, the non-alternating spreading sequence may be output of all 1's or all 0's with no transitions.

FIG. 1A shows a schematic diagram of a system in one or more embodiments of the invention. As shown in FIG. 1A, the simplistic system includes a transmitter (102) and an FSK receiver (104). The transmitter (102) and FSK receiver (104) correspond to hardware devices that include functionality to communicate. In one or more embodiments of the invention, the communications are performed using the IEEE 802.15.4k amendment transmission protocol (106). The IEEE 802.15.4k amendment transmission protocol (106) is a physical layer protocol for transmitting communications wirelessly. In one or more embodiments of the invention, communications may be transmitted with additional or alternative protocols without departing from the scope of the claims.

In one or more embodiments of the invention, the transmitter (102) includes functionality to receive bits for transmission, perform modulation on the received bits, and transmit encoded bits (108) to the FSK receiver (104). The transmitter (102) may further include functionality to perform error correction and interleaving, and data whitening.

In one or more embodiments of the invention, the FSK receiver (104) includes functionality to receive encoded bits (108), perform demodulation on the encoded bits to obtain decoded bits, an process the decoded bits. The FSK receiver (104) may further include functionality to perform error correction and interleaving, and data whitening.

Figure 1B:
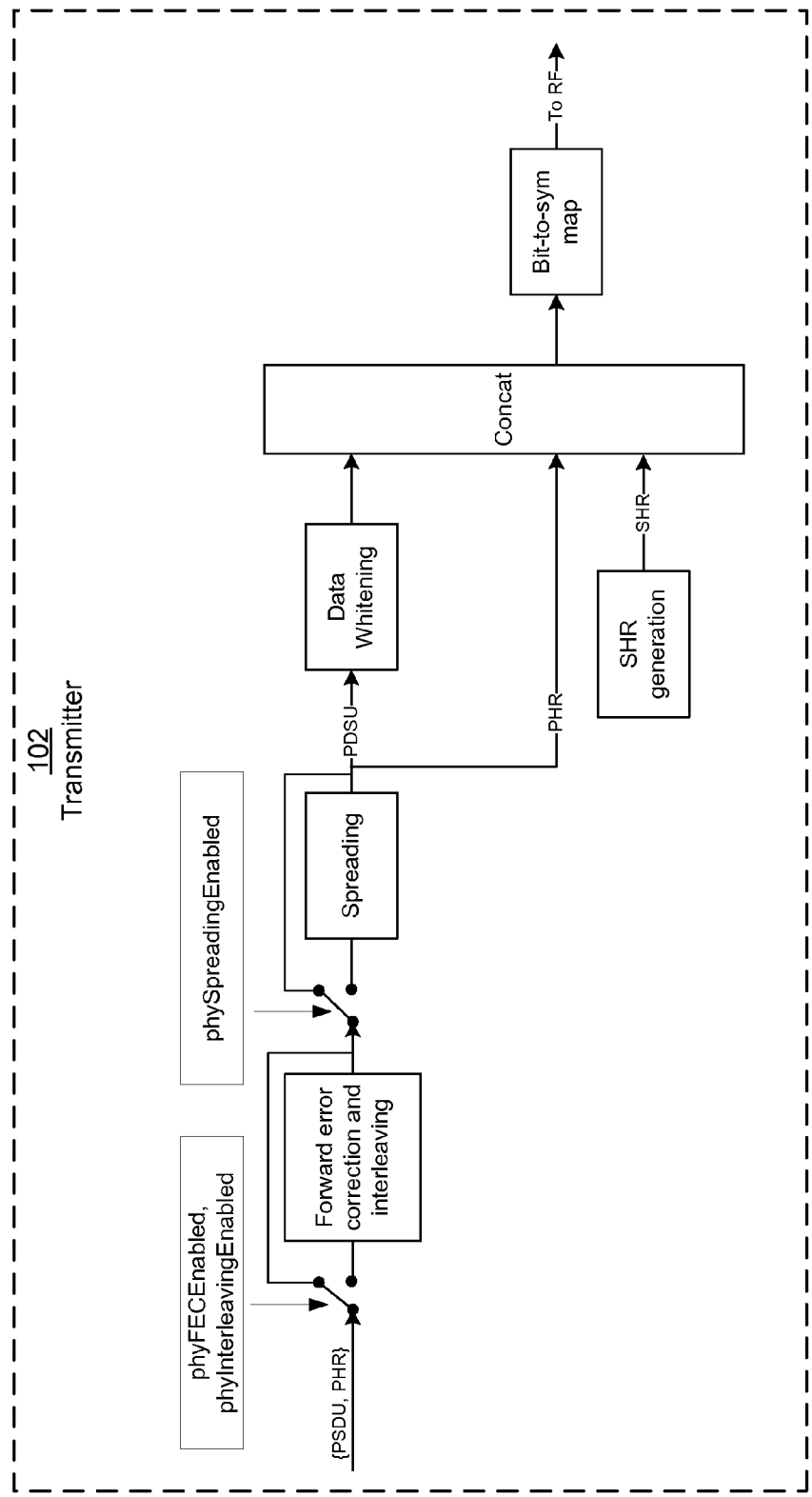

FIG. 1B shows a schematic diagram of a transmitter (102) in one or more embodiments of the invention. Specifically, FIG. 1B depicts a transmitter reference modulator diagram, which is representative of the transmitter (102) shown in FIG. 1A and described above. The operations of the transmitter reference modulator diagram shown in FIG. 1B take place in reverse at the FSK receiver, such as the FSK receiver (104) shown in FIG. 1A and described above.

Figure 2:
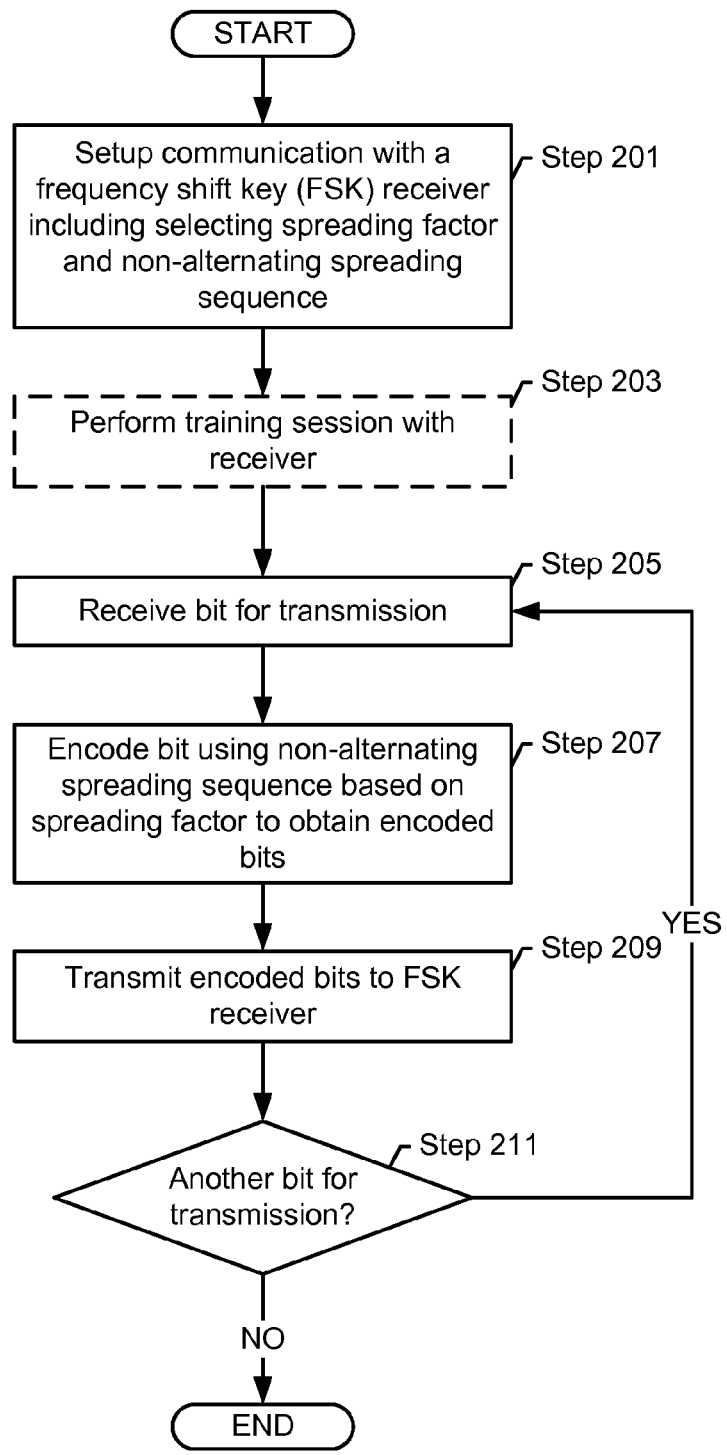
FIGS. 2 and 3 show flowcharts in one or more embodiments of the invention.
Figure 3:
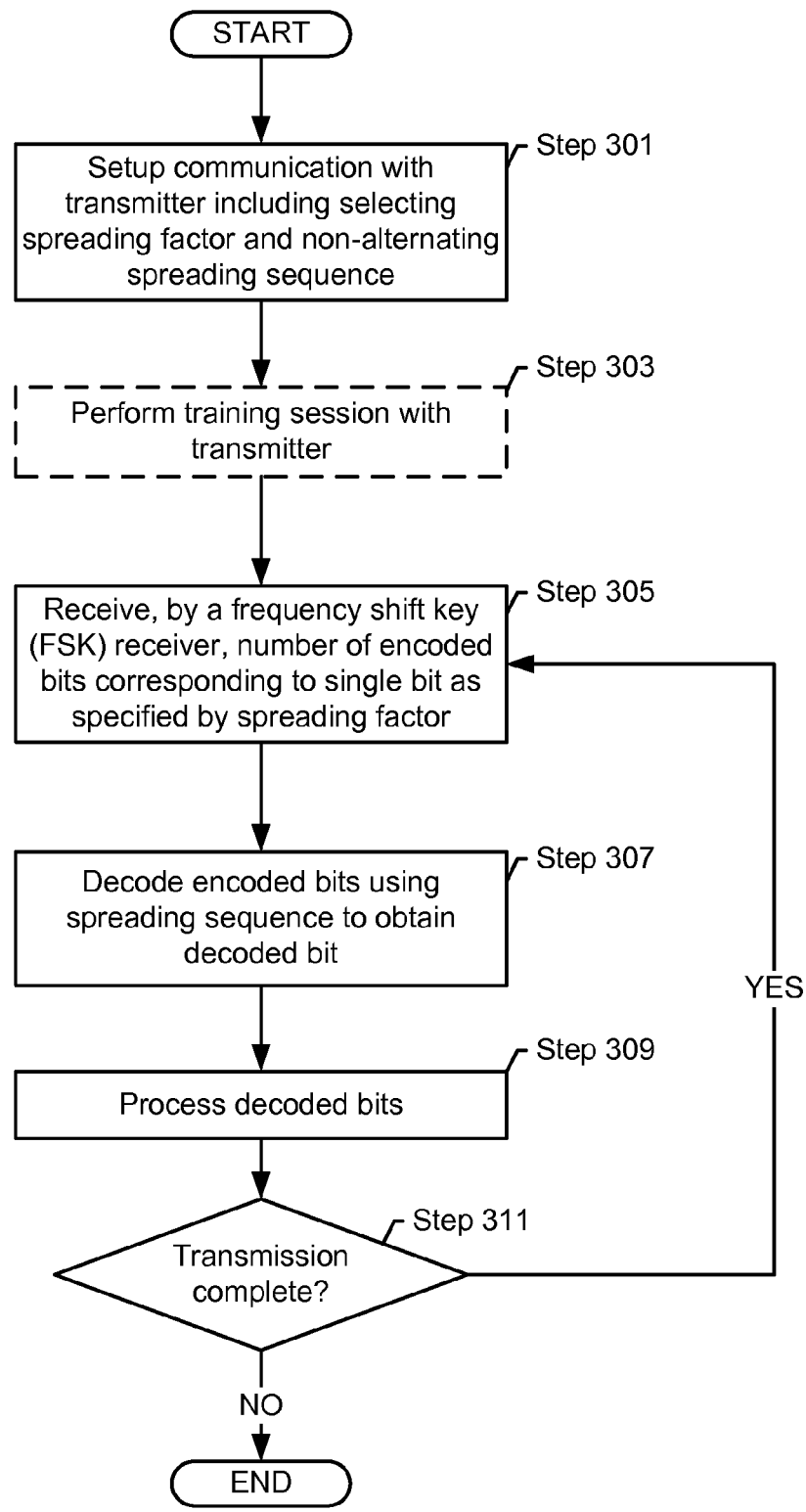

FIGS. 2 and 3 show flowcharts in one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for a transmitter to transmit a communication in one or more embodiments of the invention. In Step 201, setup of communication with the FSK receiver is performed in one or more embodiments of the invention. The setup procedures include selecting a spreading factor and a non-alternating spreading sequence. In one or more embodiments of the invention, the spreading factor is selected based on the type of noise expected in the communication. For example, when a large amount of noise is expected in a wireless communication, the spreading factor is increased. When a low amount of noise exists in the communication, the spreading factor may be minimal. In one or more embodiments of the invention, performing the setup may include contacting the FSK receiver, identifying the type of FSK receiver, and selecting the non-alternating spreading sequence based on the type of FSK receiver. For example, the MR-OQPSK PHY in the IEEE 802.15.4 standard may be selected. Further, in one or more embodiments of the invention, transmitter may notify the FSK receiver regarding which non-alternating spreading sequence is selected and what spreading factor is added.

In Step 203, a training session is optionally performed with the FSK receiver in one or more embodiments of the invention. The training session may include sending a pre-defined communication to the FSK receiver that is encoded using the chosen spreading sequence and conforms to the chosen spreading factor. When the FSK receiver receives the encoded communication, the FSK receiver may compare the encoded communication with that which the FSK receiver expects to receive to identify the amount of noise or other errors that exist in the transmission. If the FSK receiver is unable to obtain the pre-defined communication from the encoded communication, then a determination may be made that the selected non-alternating spreading sequence and/or selected spreading factor needs to be changed. Accordingly, the flow may revert to Step 201 to select a new non-alternating spreading sequence or a larger spreading factor.

Continuing with FIG. 2, in Step 205, a bit is received for transmission. Specifically, the bit may be received from a software layer or a different hardware layer on the transmitter. In Step 207, the bit is encoded using the non-alternating spreading sequence based on the spreading factor to obtain encoded bits. In particular, the transmitter may perform modulation of the bit. In other words, the transmitter replaces the bit with a series of bits defined by the non-alternating spreading sequence and spreading factor.

In Step 209, the encoded bits are transmitted to the FSK receiver. In one or more embodiments of the invention the encoded bits may be transmitted using the IEEE 802.15.4k amendment transmission protocol. Transmitting the bits may include performing additional functions, such as adding error correction and interleaving and performing whitening. The encoded bits are then transmitted wirelessly to the FSK receiver.

In Step 211, a determination is made whether another bit is received for transmission in one or more embodiments of the invention. If another bit is received, then the flow continues with Step 205 to encode the next bit using the non-alternating spreading sequence.

FIG. 3 shows a flowchart for an FSK receiver to receive a communication in one or more embodiments of the invention. In Step 301, setup of communication with the transmitter is performed in one or more embodiments of the invention. As discussed above, the setup procedure includes selecting a spreading factor and a non-alternating spreading sequence. In one or more embodiments of the invention, the FSK receiver sends a message to the transmitter indicating the type of receiver. In one or more embodiments of the invention, the transmitter may select the non-alternating spreading sequence and spreading factor. In such embodiments, the FSK receiver receives a notification of which non-alternating spreading sequence and spreading factor is selected. Alternatively, the FSK receiver may select the non-alternating spreading sequence and the spreading factor and notify the transmitter.

In Step 303, a training session is optionally performed with the transmitter in one or more embodiments of the invention. The training session may be performed as discussed above with reference to Step 203 of FIG. 2.

In Step 305, the FSK receiver receives a number of bits corresponding to a single bit as specified by the spreading factor from the transmitter. In one or more embodiments of the invention, the number of bits may be received via the IEEE 802.15.4k amendment transmission protocol. Specifically, because the spreading factor is known and the spreading factor directly relates to the number of encoded bits corresponding to a single bit, the FSK receiver may identify which encoded bits correspond to a single bit.

In Step 307, the encoded bits are decoded using the non-alternating spreading sequence to obtain a decoded bit. In particular, the bit value of 0 or 1 corresponding to the encoded bits is identified from the non-alternating spreading sequence. In one or more embodiments of the invention, decoding the encoded bits may include performing error correcting and other actions known to those skilled in the art to remove noise.

In Step 309, the decoded bit is processed. Specifically, the physical layer of the FSK receiver may pass the decoded bit to other layers of the FSK receiver for processing. For example, the decoded bits may be forwarded to a different physical device and/or presented or stored on the same physical device.

In Step 311, a determination is made whether the transmission is complete. Specifically, a determination is made whether another bit is received from the transmitter in one or more embodiments of the invention. If another bit is received, then the flow continues with Step 305 to receive the next number of encoded bits.

As shown above, embodiments of the invention apply a non-alternating spreading sequence to communications transmitted to an FSK receiver. By using the non-alternating spreading sequence, the FSK receiver may experience fewer errors caused by the transitioning between a 0 and 1.

Software instructions in the form of computer readable program code to perform embodiments may be stored, in whole or in part, temporarily or permanently, on a computer readable storage medium such as a compact disc (CD), a diskette, a tape, physical memory, or any other computer readable storage medium. Specifically, the software instructions may correspond to computer readable program code that when executed by a processor(s), is configured to perform embodiments of the invention. In one or more embodiments of the invention, the computer readable medium is a non-transitory computer readable medium.

Further, one or more embodiments of the invention may be located at a remote location and connected to the other elements over a network. Further, embodiments of the invention may be implemented on a distributed system having a plurality of nodes, where each portion of one or more embodiments may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for receiving communications by a frequency shift key (FSK) receiver, comprising:
    receiving, by the FSK receiver, encoded bits from a transmitter, wherein the encoded bits are generated using a non-altering spreading sequence, and the non-altering spreading sequence is selected by a transmitter based on a type associated with the FSK receiver;
    decoding, by the FSK receiver, the encoded bits using the non-alternating spreading sequence to obtain decoded bits, wherein the non-alternating spreading sequence comprises at least one transition; and
    processing, by the FSK receiver, the decoded bits.

2. The method of claim 1, wherein the encoded bits are received using the IEEE 802.15.4k amendment transmission protocol.

3. The method of claim 1, wherein the non-alternating spreading sequence comprises cross-correlation properties for resynchronization in a Doppler channel exceeding a threshold, and wherein the threshold is based on the type associated with the FSK receiver.

4. The method of claim 1, wherein the non-alternating spreading sequence is a direct spreading sequence used with MR-OQPSK PHY in the IEEE 802.15.4 standard.

5. The method of claim 1, wherein the non-alternating spreading sequence has a frequency of transition that is less than a threshold.

6. The method of claim 1, further comprising:
    transmitting the type associated with the FSK receiver to the transmitter; and
    receiving, from the transmitter, a notification that indicates the non-alternating spreading sequence and an associated spreading factor.

7. The method of claim 1, wherein the non-alternating spreading sequence is selected by the transmitter based further on a type of noise expected in communication with the FSK receiver.

8. The method of claim 1, further comprising:
    receiving a pre-defined communication from the transmitter that is encoded using the non-alternating spreading sequence and conforms to a selected spreading factor;
    comparing the pre-defined communication with an expected communication to identify an amount of noise;
    determining, based on the amount of noise, that a new non-alternating spreading sequence and new spreading factor should be selected.

9. A method for transmitting communications by a transmitter, comprising:
    determining a type associated with a frequency shift key (FSK) receiver;
    selecting, based on the type associated with the FSK receiver, a non-alternating spreading sequence comprising at least one transition;
    receiving a plurality of bits for transmission;
    encoding the plurality of bits using the non-alternating spreading sequence to obtain a plurality of encoded bits; and
    transmitting the plurality of encoded bits to the FSK receiver.

10. The method of claim 9, wherein the plurality of encoded bits are transmitted using the IEEE 802.15.4k amendment transmission protocol.

11. The method of claim 9, wherein the non-alternating spreading sequence comprises cross-correlation properties for resynchronization in a Doppler channel exceeding a threshold, and wherein the threshold is based on the type associated with the FSK receiver.

12. The method of claim 9, wherein the non-alternating spreading sequence is a direct spreading sequence used with MR-OQPSK PHY in the IEEE 802.15.4 standard.

13. The method of claim 9, wherein the non-alternating spreading sequence has a frequency of transition that is less than a threshold.

14. The method of claim 9, further comprising:
receiving an indication of the type associated with the FSK receiver from the FSK receiver; and
transmitting, to the FSK receiver, a notification that indicates the non-alternating spreading sequence and an associated spreading factor.

15. The method of claim 9, wherein the transmitter selects the non-alternating spreading sequence based further on a type of noise expected in communication with the FSK receiver.

16. The method of claim 9, further comprising:
transmitting a pre-defined communication to the FSK receiver that is encoded using the non-alternating spreading sequence and conforms to a selected spreading factor;
determining that the FSK receiver is unable to obtain the pre-defined communication; and
selecting a new non-alternating spreading sequence and new spreading factor for communications with the FSK receiver.

17. A transmitter for transmitting communications, comprising:
a spreading block configured to:
determine a type associated with a frequency shift key (FSK) receiver,
select, based on the type associated with the FSK receiver, a non-alternating spreading sequence comprising at least one transition,
receive a plurality of bits for transmission, and
encode the plurality of bits using the non-alternating spreading sequence to obtain a plurality of encoded bits; and
a bit-to-sym map configured to transmit the plurality of encoded bits to the FSK receiver.

18. The transmitter of claim 17, wherein the plurality of encoded bits are transmitted using the IEEE 802.15.4k amendment transmission protocol.

19. The transmitter of claim 17, wherein the non-alternating spreading sequence comprises cross-correlation properties for resynchronization in a Doppler channel exceeding a threshold, and wherein the threshold is based on the type associated with the FSK receiver.

20. The transmitter of claim 17, wherein the non-alternating spreading sequence is a direct spreading sequence used with MR-OQPSK PHY in the IEEE 802.15.4 standard.

21. The transmitter of claim 17, wherein the non-alternating spreading sequence has a frequency of transition that is less than a threshold.

22. The transmitter of claim 17, wherein the spreading block is further configured to:
receive an indication of the type associated with the FSK receiver from the FSK receiver; and
transmit, to the FSK receiver, a notification that indicates the non-alternating spreading sequence and an associated spreading factor.

23. The transmitter of claim 17, wherein the spreading block is further configured to select the non-alternating spreading sequence based further on a type of noise expected in communication with the FSK receiver.

24. The transmitter of claim 17, configured to:
transmit a pre-defined communication to the FSK receiver that is encoded using the non-alternating spreading sequence and conforms to a selected spreading factor;
determine that the FSK receiver is unable to obtain the pre-defined communication; and
select a new non-alternating spreading sequence and new spreading factor for communications with the FSK receiver.

25. A non-transitory computer readable medium comprising computer readable program code for transmitting communications by a transmitter, by:
determining a type associated with a frequency shift key (FSK) receiver;
selecting, based on the type associated with the FSK receiver, a non-alternating spreading sequence comprising at least one transition;
receiving a plurality of bits for transmission;
encoding the plurality of bits using the non-alternating spreading sequence to obtain a plurality of encoded bits; and
transmitting the plurality of encoded bits to the FSK receiver.

26. The non-transitory computer readable medium of claim 25, wherein the plurality of encoded bits are transmitted using the IEEE 802.15.4k amendment transmission protocol.

27. The non-transitory computer readable medium of claim 25, wherein the non-alternating spreading sequence comprises cross-correlation properties for resynchronization in a Doppler channel exceeding a threshold, and wherein the threshold is based on the type associated with the FSK receiver.

28. The non-transitory computer readable medium of claim 25, wherein the non-alternating spreading sequence is a direct spreading sequence used with MR-OQPSK PHY in the IEEE 802.15.4 standard.

29. The non-transitory computer readable medium of claim 25, wherein the non-alternating spreading sequence has a frequency of transition that is less than a threshold.

30. The non-transitory computer-readable medium of claim 25, further comprising:
receiving an indication of the type associated with the FSK receiver from the FSK receiver; and
transmitting, to the FSK receiver, a notification that indicates the non-alternating spreading sequence and an associated spreading factor.

31. The non-transitory computer-readable medium of claim 25, wherein the transmitter selects the non-alternating spreading sequence based further on a type of noise expected in communication with the FSK receiver.

32. The non-transitory computer-readable medium of claim 25, further comprising:
transmitting a pre-defined communication to the FSK receiver that is encoded using the non-alternating spreading sequence and conforms to a selected spreading factor;
determining that the FSK receiver is unable to obtain the pre-defined communication; and
selecting a new non-alternating spreading sequence and new spreading factor for communications with the FSK receiver.

* * * * *